Patented June 15, 1937

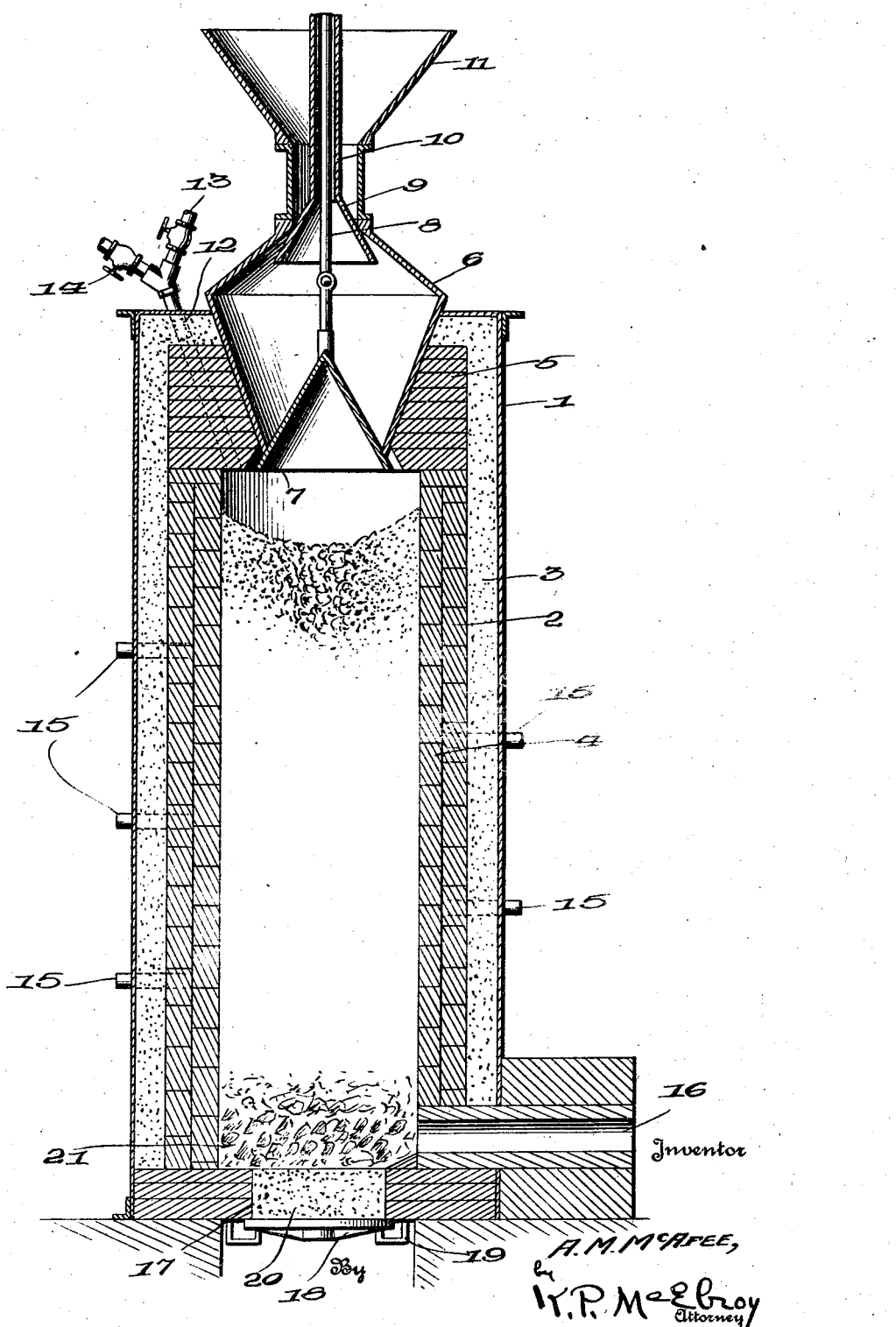

2,084,290

UNITED STATES PATENT OFFICE 2,084,290

PROCESS OF MAKING ALUMINUM CHLORIDE

Almer McDuffie McAfee, Port Arthur, Tex., assignor, by mesne assignments, to Gulf Oil Corporation, Pittsburgh, Pa., a corporation of Pennsylvania Application September 26, 1927, Serial No. 222,109
Renewed November 9, 1936

16 Claims. (Cl. 23—95)

This invention relates to processes of making aluminum chloride; and it comprises a method of chlorinating bauxite or other forms of alumina by the conjoint action of chlorine and carbon wherein the heat necessary for the action is maintained by admission of oxygen with the chlorine, and control of the temperature is afforded by the employment of varying amounts of diluent gas in conjunction with the introduced oxygen, the diluent gas being usually nitrogen; the nitrogen when so used being sometimes employed in the form of air and sometimes in the form of nitrogen itself; all as more fully hereinafter set forth and as claimed.

The oldest method for the manufacture of aluminum chloride is to subject a mixture of hot carbon and alumina in a heated retort to the action of chlorine. However, on a large scale this method has proved impracticable for a number of reasons; one being the difficulty of obtaining structural materials which would withstand the joint action of chlorine and carbon at the temperature necessary in making aluminum chloride.

In modern large-scale practice externally heated retorts of this type are not used; the reaction being carried on in lined chambers of some sort and much or most of the heat necessary being either generated internally or supplied as preheat of the reacting materials.

The reactions which take place in the formation of aluminum chloride from alumina and carbon by chlorine are probably quite complicated. In the most approved view of these actions carbon monoxide is regarded as functioning, so to speak, as a carrier; the carbon monoxide cooperating with chlorine to form aluminum chloride from alumina with formation of carbon dioxide, this carbon dioxide being again reduced by the carbon to form more carbon monoxide and so on. All the indications are that some action of this sort takes place. The actual amount of heat necessary to keep the reaction going depends in some measure on whether the final gaseous product is CO or $CO_2$. In any event some heat must be supplied to the zone of reaction to keep the action going. The temperatures at which chlorine can be made to react with alumina and carbon to form aluminum chloride cover a wide range; the reaction velocity however increasing with the temperature. Some aluminum chloride can be formed at as low a temperature as 1000° F., but the speed of reaction at this temperature is inordinately slow and the yield (based on chlorine used) is poor, due to part of the chlorine passing through the charge unchanged, and part forming other bodies than aluminum chloride. To get speed and good absorption of the chlorine I have found 1600° F is about the low limit, and I prefer considerably higher temperatures, say, around 2000° F.

In the present invention, reaction is in a sort of crater, reacting gases being supplied from above while the aluminum chloride vapors pass downward from the crater through the hot charge. A certain depth of material is maintained below the crater, the charge being replenished when the crater reaches this portion. In this way of operating, reaction is largely axial.

I have found that quick and ready reaction can be obtained by the expedient of supplying some oxygen with the chlorine. If air be used in lieu of oxygen, while sufficiently high temperatures can be obtained, and particularly if the air be preheated, there seems to be some difficulty because of the dilution due to the great amount of nitrogen present in the air. Air is 80 per cent nitrogen (and argon). It seems as if the presence of this large amount of nitrogen, using the theory already mentioned, mechanically impedes the circulation of carbon in the gaseous form enough to slow down the action as a whole quite considerably. On the other hand, it is also found in some cases that using oxygen in a pure state the actions become somewhat too violent and localized, causing difficulties in operation, and particularly with impure alumina. Nearly all bauxite contains silica and iron and other bodies which are capable of forming relatively low melting slags; that is slags melting at a lower temperature than the alumina itself. With a mixture of pure oxygen and chlorine there is apt to be localized developments of high temperature and slagging clinkering or sintering which interferes with the draft through the charge and disturbs the actions generally.

I have found that in this type of action however I can obtain improved results by using diluent gas with the oxygen; the oxygen however not being diluted to the extent that it is in air. By diminishing the proportion of nitrogen to oxygen below that normal to air there is less interference with the reducing action, and on the other hand with some nitrogen present there is not the development in the charge of localized spots or areas of high temperature. The whole action goes on more smoothly and uniformly than with either air or pure oxygen.

In making aluminum chloride with the aid of oxygen no fixed proportion of oxygen to chlorine is used. The amount of oxygen relative to chlorine which is required varies with the particular apparatus, the size of the charge and a number of other conditions. The function of the oxygen is to keep up the heat, supplying radiation losses, sensible heat carried off by the gases and vapors, etc. and these are variable. But whatever the amount of oxygen relative to the chlorine be employed, in the present invention I use some nitrogen with it; the amount of nitrogen however being considerably below that normal to air. In air the ratio by volume of oxygen to nitrogen (and argon) is 21:79. In the gas mixtures used in the present invention I rarely have an oxygen:nitrogen ratio less than 50:50 or more than 80:20. As a rule a ratio of oxygen to nitrogen of 60:40 is most advisable. In one particular apparatus consisting of a vertical shaft 3 feet in diameter and carrying a normal charge 10 feet in initial depth, I supply oxygen and chlorine in the ratio of 1:3.3 and with the oxygen I mix an equal volume of air. This gives me in this particular case an oxygen:nitrogen ratio of 60:40. Advantageous ratios for the oxygen, chlorine and nitrogen are therefore about 20:67:13 parts by volume.

Oxygen is usually made commercially in air liquefying plants which deliver oxygen and nitrogen. Where the oxygen used for the present purposes is from such a plant, nitrogen furnished by the plant can be used for dilution. It has the advantage over air in that it is completely dry. Air used in the present process must usually be dried before use; this being particularly the case in wet climates. All moisture gaining access to the system results in a loss of chlorine as HCl. Consequently the nitrogen from these plants being already dried I regard it as particularly advantageous for use in the present invention.

In the accompanying drawing I have illustrated one form of apparatus useful in the performance of my process.

The figure is a vertical section through the apparatus.

In the drawing, 1 is a steel or cast iron shell surrounding a circular firebrick shaft 2 with intervening heat insulating material, 3, which may be bauxite dust or the like. The shaft has a firebrick lining 4. At the top the shaft is built up with firebrick 5 to accommodate the feeding device which comprises the large hopper 6 having the feeding bell 7 operated by the link-and-rod 8. The bell should be made of reinforced clay or covered with clay, particularly on the under side. The top of the hopper is normally closed by means of the bell 9 operated by sleeve 10, the upper bell 9 maintaining a preliminary charge of material in the hopper 11. Hopper 11 is filled with material, the sleeve 10 lowered to release the bell 9 and feed to the hopper 6 an amount of material, whereupon the sleeve 10 is elevated, closing the bottom of the hopper 11 and allowing the dumping of the charge from hopper 6 to the shaft past the bell 7 when the arm 8 is lowered. The charge of aluminous material such as bauxite and carbon (preferably petroleum coke breeze), both in granular form, is delivered by means of the bell 7 in such a way that the charge hits the wall and the larger granules roll towards the center while the smaller granules repose adjacent the inner lining. The result is the formation of a vertical column of material graded radially with respect to the shaft in such a way that the coarser materials are in the center and the finer materials towards the periphery and forming a column more pervious towards the axis than at the periphery. The process of chlorinating materials so arranged is not claimed in this application, it forming the subject of a co-pending application of McAfee and Roberts, Serial No. 222,108 filed September 26, 1927; now Patent No. 1,690,990.

The reaction chamber thus described is provided at its top with a flue 12 for introduction of the gases to be used in the reaction and such flue is provided with the valved pipe 13 for admission of the diluent gas and with the valved pipe 14 for admission of chlorine and oxygen, although of course the several different gases used in the process may be admitted at the retort through separate pipes or one single pipe, the admixture being made elsewhere.

At intervals along the length the furnace is provided with pyrometers 15 for observing and recording temperatures. At the lower end there is the outlet 16 for aluminum chloride vapors leading to a condenser (not shown), and on the under side of the reaction chamber is the opening 17 through which access may be had to the interior of the shaft; this opening being closed by a cover 18 held in place by clamps 19 and usually containing as a seal 20, particles of ashes or the like. In order to prevent clogging of the off-take 16 during charge and operation of the process, I place a number of broken firebrick or the like 21 in the bottom of the shaft.

In operation, a mixture of aluminous material, such as bauxite, and carbon, in the proportion of approximately 60 parts by weight of the aluminous material and 40 parts by weight of the carbon, is charged to the furnace through the hopper operated as described, leaving a gas space of approximately two feet at the top. Both carbon and alumina should be free of moisture and volatile matters. The lower cover 18 being in place and the broken firebrick having been supplied, the apparatus is ready for operation. The mixture of aluminous material and carbon is charged at a temperature of about 1100° F. or at a temperature where the carbon will ignite on exposure to oxygen. A mixture of chlorine and oxygen is supplied through the pipe 14 and the air, nitrogen or other diluent gas is admitted through the inlet 13. As the aluminum chloride is formed it passes downward through the charge and escapes through outlet 16 to the condenser and as the charge is consumed the finer materials near the periphery roll towards the center and are consumed, the top of the charge developing and maintaining a concave shape, or crater, approximately as shown. When the tail gases show a trace of chlorine the admission of gas is stopped and a new charge introduced into the furnace. This usually occurs after a ten foot charge has been consumed down to a point where approximately 2½ to 3 feet of solid materials are left in the shaft, the exact depth of this remaining material which is sufficient to insure total conversion of chlorine depending of course upon the diameter of the shaft and the rate of feed of gas to the reaction chamber. A certain depth of charge is necessary to secure complete utilization of chlorine. However with the double hopper arrangement shown feed may be continuous.

When the gases are fed to the charge the temperature in the zone of reaction at the axis rapidly rises until it reaches the neighborhood of 2000° F. which I consider an advantageous operating temperature. I endeavor not to substantially exceed 2000° F. and not to go below a temperature of 1600° F. after the operating temperature is once established. The chlorine and oxygen may be admixed in proportions hereinbefore specified and conveyed together to the flue 12 by means of pipe 14 and the diluent gas may be admitted from another source through the inlet 13, or the chlorine, oxygen, and diluent gas may be separately delivered to the flue 12.

In a specific embodiment of my invention the apparatus is charged with a heated mixture of bauxite and petroleum coke in the proportion of approximately 60 of the former and 40 of the latter by weight, and at a charging temperature not substantially lower than 1100° F. The gaseous material is then led through the charge. I may use one volume of oxygen to 3.3 volumes of chlorine, and at the early stage of the operation for every 80 parts of oxygen I may use 20 parts by volume of nitrogen. In the latter part of the operation I may use 60 parts of oxygen to 40 parts of nitrogen, with an average through the operation of about 50 parts of oxygen to 50 parts of nitrogen. The amount of diluent gas desirable depends upon the temperature of the charge at the time. When the temperature tends to substantially exceed 2000° F., I increase the ratio of diluent gas to the oxygen and when the temperature tends to go substantially below 2000° F., I decrease the ratio of the diluent gas to the oxygen.

While I regard nitrogen as being the best and most convenient diluent gas to employ in the present invention, I do not necessarily restrict myself to its use. Nitrogen from an air-liquefying plant has, as stated, an advantage over nitrogen in the form of air in that it requires no drying. Ordinary air is usually moist and it is disadvantageous to use it without drying. Various waste gases containing carbon dioxide, such as boiler flue gases may be employed in the present invention as diluents. Such gases contain nitrogen and carbon dioxide. The carbon dioxide exercises a specific cooling action which may or may not be desired. When using flue gase as a diluent less proportions are desirable than in using nitrogen. Producer gas is another diluent which may be employed. When supplied to the reaction chamber together with oxygen it burns with the development of heat and formation of $CO_2$; and this development of heat may be useful. In using flue gases or producer gas it is well, as before, to avoid as far as possible the presence of hydrogen or moisture. Both represent a loss of chlorine in the operation, the lost chlorine going off as HCl. Gases from the operation itself may be used as a diluent. In so doing the silicon tetrachloride and titanium chloride which are ordinarily present when using bauxite may be first removed.

What I claim is:—

1. In the manufacture of aluminum chloride from a charge of coke and bauxite with the aid of chlorine passed therethrough the process which comprises maintaining the temperature in the reaction zone by supplying thereto with the chlorine a varying mixture of nitrogen and oxygen, the proportion of nitrogen increasing with the observed tendency to rise in temperature.

2. In the manufacture of aluminum chloride by the use of chlorine and oxygen passed through a charge of carbon and aluminous material containing slagging impurities, the process which comprises keeping the temperature of the reacting mixture below the clinkering point by admixing nitrogen with said oxygen.

3. In the manufacture of aluminum chloride from a hot charge of a mixture of alumina and carbon by a draft current of chlorine passed therethrough, the process of maintaining and controlling temperatures in the charge which comprises separating the oxygen and nitrogen of air by a refrigeration process and supplying oxygen so separated to the chlorine draft together with a minor proportion of nitrogen so separated, the proportion of nitrogen being merely that which will prevent slagging, clinkering and sintering.

4. In the manufacture of aluminum chloride by passing a mixture of oxygen and chlorine through a pervious charge of alumina and carbon, the process of maintaining the temperature in the reaction zone within controlled limits which comprises diluting the oxygen with varying amounts of an inert gas, the dilution increasing with the observed rise in temperature.

5. In the manufacture of aluminum chloride by passing a mixture of oxygen and chlorine through a pervious charge of alumina and carbon the process of maintaining the temperature in the reaction zone within controlled limits which comprises diluting the oxygen with varying amounts of a gas comprising nitrogen, the dilution increasing with the observed rise in temperature.

6. In the manufacture of aluminum chloride from a pervious charge of hot bauxite and coke by the passage of a draft current of chlorine therethrough with maintenance of temperature by oxygen supplied to the zone of reaction, the process which comprises separating air into dry oxygen and dry nitrogen, supplying oxygen so separated to the zone of reaction and also sending to said zone a fraction of the dry nitrogen so separated.

7. The process of making aluminum chloride which comprises passing chlorine and oxygen diluted with air into and through a pervious charge of aluminous material and carbon at a temperature sufficient to form vapors of aluminum chloride and condensing the aluminum chloride vapors formed.

8. The process of making aluminum chloride which comprises establishing and maintaining a charge of aluminous material and carbon, passing chlorine in and through said charge and admixing with the chlorine a mixture of oxygen and nitrogen containing a sub-atmospheric proportion of nitrogen.

9. In the manufacture of aluminum chloride, the process which comprises contacting at reactive temperatures aluminous material and carbon with a gas mixture comprising chlorine, oxygen and nitrogen; the volume ratio of the oxygen to the nitrogen being between 50:50 and 80:20.

10. In the manufacture of aluminum chloride, the process which comprises contacting at reactive temperatures aluminous material and carbon with a gas mixture comprising chlorine, oxygen and nitrogen; the volume ratio of the oxygen to the chlorine being approximately 1 to 3.3.

11. In the manufacture of aluminum chloride, the process which comprises contacting at reactive temperatures aluminous material and carbon with a gas mixture comprising chlorine, oxygen and nitrogen; the volume ratio of the oxygen to the chlorine being about 1 to 3.3 and that of the oxygen to the nitrogen being between 50:50 and 80:20.

12. In the manufacture of aluminum chloride, the process which comprises contacting at reactive temperatures aluminous material and carbon with a gas mixture comprising chlorine, oxygen and nitrogen; the volume ratio of the oxygen to the nitrogen being approximately 60 to 40.

13. In the manufacture of aluminum chloride, the process which comprises contacting at reactive temperatures aluminous material and carbon with a gas mixture comprising chlorine, oxygen and nitrogen; the volume ratios of the oxygen, chlorine and nitrogen being approximately 20:67:13.

14. In the manufacture of aluminum chloride, the process which comprises passing chlorine, nitrogen and oxygen through a hot, axially pervious charge of alumina and carbon in downdraft and controlling the temperature in the charge by altering the proportion of said nitrogen.

15. In the manufacture of aluminum chloride, the process which comprises passing a mixture of chlorine, nitrogen and oxygen through a loose unbriquetted mass of coke and bauxite heated to reactive temperatures, the amount of nitrogen in said mixture being less than the amount of oxygen.

16. In the manufacture of aluminum chloride, the process which comprises passing chlorine and a mixture of oxygen and an inert gas through a pervious charge of carbon and aluminous material heated to reactive temperatures, said gas mixture containing a super-atmospheric proportion of oxygen.

ALMER McDUFFIE McAFEE.